United States Patent
Khalid et al.

(10) Patent No.: US 11,388,609 B2
(45) Date of Patent: Jul. 12, 2022

(54) METHOD AND APPARATUS FOR COVERAGE DETERMINATION AND DOWNLOAD OPPORTUNITY NOTIFICATION

(71) Applicant: Charter Communications Operating, LLC, St. Louis, MO (US)

(72) Inventors: Saran Khalid, Denver, CO (US); Zalak Shrof, Sterling Heights, MI (US)

(73) Assignee: Charter Communications Operating, LLC, St. Louis, MO (US)

( * ) Notice: Subject to any disclaimer, the term of this patent is extended or adjusted under 35 U.S.C. 154(b) by 188 days.

(21) Appl. No.: 16/710,129

(22) Filed: Dec. 11, 2019

(65) Prior Publication Data

US 2021/0185545 A1 Jun. 17, 2021

(51) Int. Cl.
*H04W 16/18* (2009.01)
*H04W 4/02* (2018.01)
(Continued)

(52) U.S. Cl.
CPC .......... *H04W 16/18* (2013.01); *H04L 67/535* (2022.05); *H04W 4/025* (2013.01);
(Continued)

(58) Field of Classification Search
CPC ... H04W 16/18; H04W 4/025; H04W 40/246; H04W 28/0215; H04W 28/04;
(Continued)

(56) References Cited

U.S. PATENT DOCUMENTS 8,117,303 B2 2/2012 Fonsen
2009/0326810 A1 * 12/2009 Callaghan ............. H04L 67/289
701/532
(Continued)

FOREIGN PATENT DOCUMENTS

EP 2658211 A1 * 10/2013 ........... G08G 1/0133
WO WO-2015070371 A * 5/2015 .............. H04W 4/44
WO WO-2015132759 A1 * 9/2015 ......... H04L 65/4084

OTHER PUBLICATIONS

Singh et al. IEEE: predictive buffering for streaming video in 3g network (Year: 2012).*

*Primary Examiner* — Rina C Pancholi
(74) *Attorney, Agent, or Firm* — Young Basile Hanlon & MacFarlane, P.C.

(57) ABSTRACT

Disclosed herein are methods and apparatus for coverage determination and download opportunity notification. A method for content coverage determination and download opportunity includes obtaining, by a content coverage application running on a mobile device, an itinerary from a map application on the mobile device. The content coverage application sends the itinerary and mobile device characteristics to a coverage determination system and receives a wireless coverage profile based on the itinerary and the mobile device characteristics. The content coverage application generates a list of entertainment applications running on the mobile device. The content coverage application provides a notification of a wireless coverage gap based on the wireless coverage profile and displays the list of entertainment applications and status for each listed entertainment application in response to user input. The content coverage application sends instructions to one or more of the listed entertainment applications to download content in response to user selections.

19 Claims, 9 Drawing Sheets

(51) Int. Cl.

| | | |
|---|---|---|
| *H04W 40/24* | (2009.01) | |
| *H04W 28/02* | (2009.01) | |
| *H04W 28/04* | (2009.01) | |
| *H04W 68/06* | (2009.01) | |
| *H04L 67/50* | (2022.01) | |

(52) U.S. Cl.
CPC ....... *H04W 28/0215* (2013.01); *H04W 28/04* (2013.01); *H04W 40/246* (2013.01); *H04W 40/248* (2013.01); *H04W 68/06* (2013.01)

(58) Field of Classification Search
CPC ... H04W 40/248; H04W 68/06; H04W 16/22; H04W 4/02–029; H04L 67/22
See application file for complete search history.

(56) References Cited

U.S. PATENT DOCUMENTS

| | | | | |
|---|---|---|---|---|
| 2013/0151659 | A1* | 6/2013 | Alberth | H04L 67/289 |
| | | | | 709/217 |
| 2016/0021508 | A1* | 1/2016 | Dunkin | G01C 21/3415 |
| | | | | 701/518 |
| 2016/0057639 | A1* | 2/2016 | Smith | H04W 4/029 |
| | | | | 455/423 |
| 2019/0222893 | A1* | 7/2019 | Topiwalla | H04N 21/482 |

* cited by examiner

METHOD AND APPARATUS FOR COVERAGE DETERMINATION AND DOWNLOAD OPPORTUNITY NOTIFICATION

TECHNICAL FIELD

This disclosure relates to streaming content on mobile devices. More specifically, this disclosure relates to determining impending coverage lapse and notifying user of download availabilities.

BACKGROUND

Mobile devices use Internet connectivity to stream audio and/or video content or media from content providers, where the Internet connectivity is provided via wireless networks. Due to the inherent nature of the mobile devices, wireless network connectivity can vary and cause disruptions in enjoying the content. Techniques for tracking wireless network connectivity tend to be processor and power intensive, which in turn drains the battery of the mobile device.

SUMMARY

Disclosed herein are methods and apparatus for coverage determination and download opportunity notification. In an implementation, a method for content coverage determination and download opportunity includes obtaining, by a content coverage application running on a mobile device, an itinerary from a map application on the mobile device. The content coverage application sends the itinerary and mobile device characteristics to a coverage determination system and receives a wireless coverage profile based on the itinerary and the mobile device characteristics. The content coverage application generates a list of entertainment applications running on the mobile device. The content coverage application provides a notification of a wireless coverage gap based on the wireless coverage profile and displays the list of entertainment applications and status for each listed entertainment application in response to user input. The content coverage application sends instructions to one or more of the listed entertainment applications to download content in response to user selections.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, streaming, Internet Protocol (IP) video, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 1:
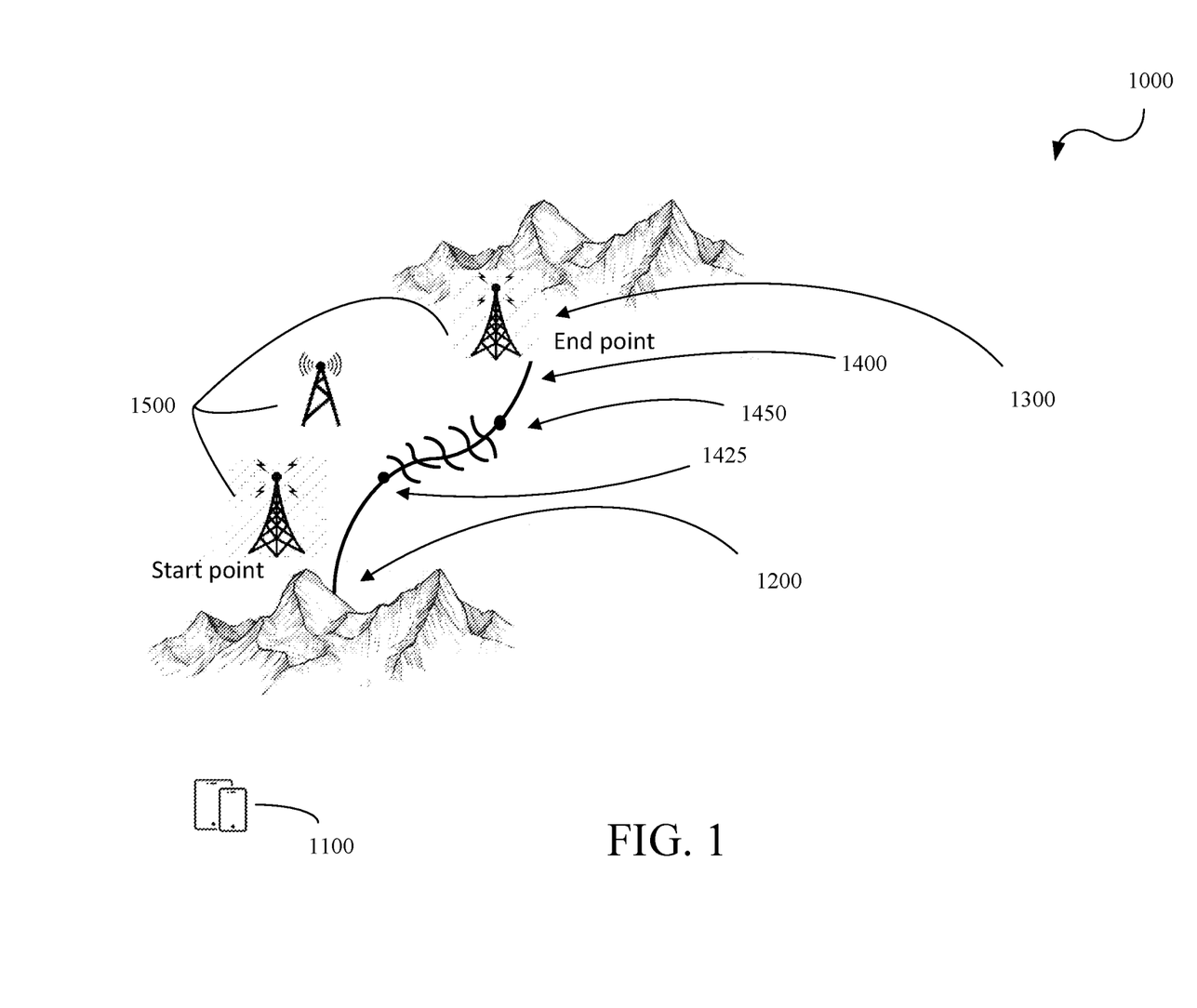
FIG. 1 is a diagram of an example scenario in accordance with embodiments of this disclosure.

FIG. 1 is a diagram of an example scenario 1000 in accordance with embodiments of this disclosure. In scenario 1000, a user of a mobile device 1100 may be traveling from a start point 1200 to an end point 1300. A map application (as described herein below) on the mobile device 1100 may determine an itinerary 1400 for traveling from the start point 1200 to the end point 1300. Wireless coverage may be provided via base stations 1500 so that the user can stream content from entertainment applications on the mobile device 1100. However, in certain instances, the wireless coverage may be interrupted or lost. For example, wireless coverage may not be available between points 1425 and 1450 along the itinerary 1400. Consequently, the user of the mobile device 1100 would not be able to stream content from the entertainment applications or be able to use the map application for navigation along the itinerary 1400.

Described herein are methods and apparatus for coverage determination and download opportunity notification. Mobile devices are provided with a content coverage application which notifies users of upcoming or impending wireless coverage loss. The notifications can be popup windows, banner messages, audio alerts, and the like. The notifications can include time to wireless coverage loss, distance to wireless coverage loss, and length of wireless coverage loss in time, distance, or both. Users are provided an opportunity to select content for downloading prior to the wireless coverage loss. The mechanism may improve user experience when using entertainment or content providing applications during travel. For example, this allows a user to watch a show or listen to music during the loss of wireless coverage.

In an implementation, the content coverage application interacts or communicates with other applications to determine wireless coverage for a given itinerary. The application may obtain the itinerary from a map application and then provide the itinerary and mobile device specifications to a coverage determination application which determines coverage information based on the itinerary and the mobile device specifications. The content coverage application can then provide notifications to the user when reaching an area where there is a gap in wireless coverage.

In an implementation, the content coverage application interacts or communicates with entertainment applications such as IP video applications, music applications, and the like. A user can open the content coverage application when a notification is provided of wireless coverage disruption, which would then display or provide a list of the entertainment applications with an active/inactive status. The content coverage application interacts with user selected entertainment applications to download content.

Figure 2:
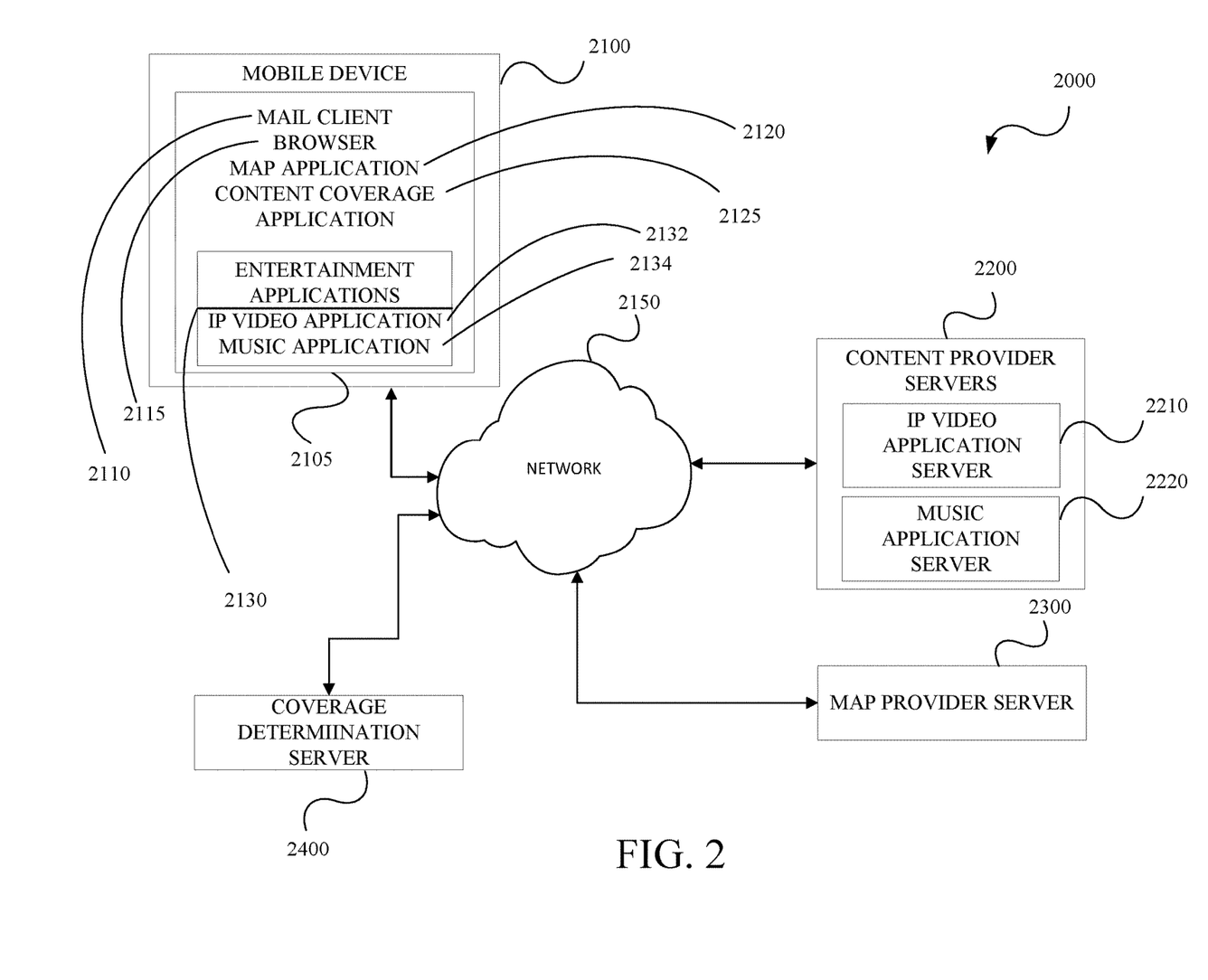
FIG. 2 is a diagram of an example architecture of a network in accordance with embodiments of this disclosure.

FIG. 2 is a diagram of an example architecture 2000 for coverage determination and download opportunity notification in accordance with embodiments of this disclosure. In an implementation, the architecture 2000 may include a mobile device 2100 connected to or in communication with (collectively "connected to") content provider systems 2200 via a network 2150. The mobile device 2100 may also be connected to a coverage determination server 2400 and a map provider server 2300 via the network 2150. The connections between the mobile device 2100, the content provider servers 2200, the network 2150, the coverage determination server 2400, and the map provider server 2300 may be wired, wireless or a combination thereof. In an implementation, the architecture 2000 may execute the techniques described in FIGS. 7-9. The architecture 2000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The mobile device 2100 may be, but is not limited to, end user devices, cellular telephones, Internet Protocol (IP) devices, mobile computers, laptops, handheld computers, PDAs, personal media devices, smartphones, notebooks, notepads, phablets and the like. For example, in an implementation, the mobile device 2100 may include applications such as, but not limited to, a mail application 2110, a web browser application 2115, a map application 2120, a content coverage application 2125, and entertainment applications 2130 including for example but not limited to, an IP video application 2132, music application 2134, and the like.

The content provider servers 2200 may provide content to the mobile device 2100. The content provider servers 2200 may include, but is not limited to, an IP video application server 2210, a music application server 2220, and the like. For example, the IP video application server 2210 may communicate with the IP video application 2105 on the mobile device 2100. In an implementation, the communication may be via an IP network in the network 2150. The content provider servers 2200 are illustrative and may include additional, fewer or different services and servers, entities and the like which may be similarly or differently architected without departing from the scope of the specification and claims herein.

The map provider server 2300 may provide location and path information (collectively an "itinerary"), estimated time or arrival information, and the like to a user based on user inputs. The map provider server 2300 may communicate with the map application 2120 on the mobile device 2100. In an implementation, the communication may be via an IP network in the network 2150. The itinerary may be provided in a variety of geographic coordinates including latitude and longitude coordinates, and the like.

The coverage determination server 2400 may use mobile device specifications and itinerary information as provided via the content coverage application 2125 to determine wireless coverage information. In an implementation, the mobile device specifications may include, but are not limited to, antenna configuration, chip configuration, model number, radio configuration, and the like. The coverage determination server 2400 may use wireless coverage mapping information and propagation models to determine a wireless coverage profile for the mobile device 2100 for the itinerary. The wireless coverage profile may be provided in a variety of geographic coordinates including latitude and longitude coordinates, and the like. For example, the coverage determination server 2400 may be industrial standard tools such as ATOLL and Mentum Planet, propagation algorithms running on big data to determine the propagations, hybrid techniques using deterministic, empirical, and network data to obtain propagation for a given device.

The content coverage application 2125 may be connected to the entertainment applications 2130, the map application 2120, the coverage determination server 2400, and the like. The content coverage application 2125 can maintain a list of the entertainment applications 2130 and the map application 2120 along with status. For example, the status may be active, inactive, connected, unconnected, and the like. The content coverage application 2125 can send notifications based on the wireless coverage profile, provide a user interface to select entertainment applications 2130, and communicate with the entertainment applications 2130 to download content as needed. In an implementation, the content coverage application 2125 may run in the background to collect information regarding the entertainment applications 2130, obtain any itinerary which may be available via the map application 2120, and request wireless coverage profile from the coverage determination server 2400.

The network 2150 may be and may include, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, an IP network, and like including any combinations thereof. In an implementation, the network 2150 may contain one or more servers, network elements or devices, and the like.

Operationally, a user may initiate generation of an itinerary by the map application 2120 based on an indication of a start point and an end point. The content coverage application 2125 may send the itinerary and mobile device 2100 specifications to the coverage determination server 2400 to determine a wireless coverage profile for the itinerary. The content coverage application 2125 may also interface with the entertainment applications 2130 to generate a list of the entertainment applications 2130 and operational status. In an implementation, the content coverage application 2125 and the entertainment applications 2130 may communicate on a defined interval to communicate the operational status. In an implementation, the content coverage application 2125 and the entertainment applications 2130 may communicate on an event driven basis when, for example, there is a change in the operational status.

Figure 3:
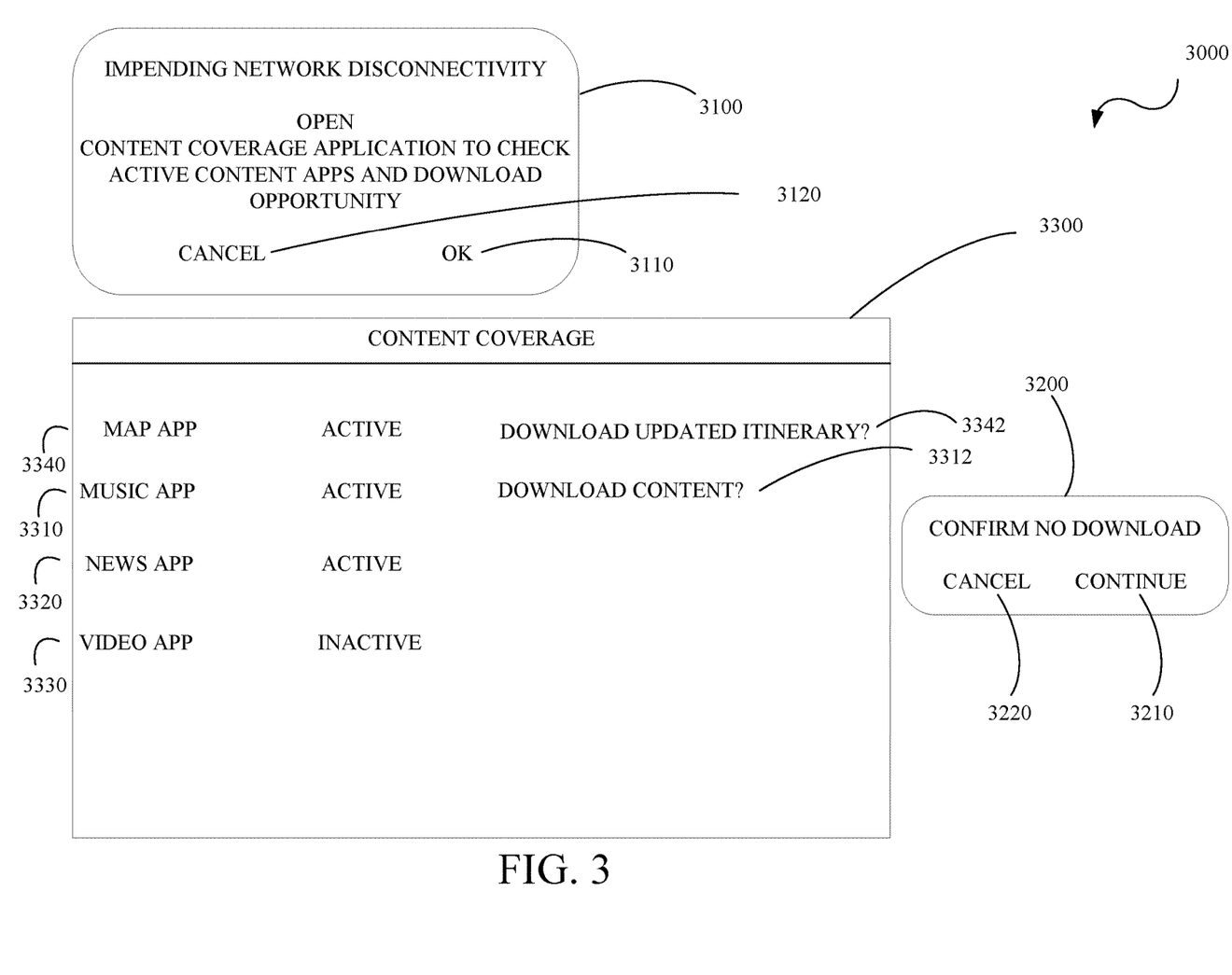
FIG. 3 is a flow block diagram of example notifications in accordance with embodiments of this disclosure.

Referring now also to FIG. 3, which is a flow block diagram of example notifications in accordance with embodiments of this disclosure, the content coverage application 2125 may generate a notification 3100 of an impending wireless coverage disruption. In an implementation, the notifications may be sent based on distance from a wireless coverage gap, travel time to the wireless coverage gap, or a combination thereof. In an implementation, the notification 3100 may include information as to when the wireless coverage disruption may occur, how long the wireless coverage disruption may last, and the like. In an implementation, the notification 3100 may include an open button 3110 to open the content coverage application 2125 or a cancel button 3120 to ignore the wireless coverage disruption.

In the event of the user clicking on the cancel button 3120, the content coverage application 2125 may generate a confirmation notification 3200, which may include a continue button 3210 and a cancel button 3220. This provides the user a second opportunity to download content prior to wireless coverage disruption by clicking on the cancel button 3220. Clicking of the continue button 3210 confirms no downloads.

In the event of the user clicking on the open button 3110, the content coverage application 2125 opens a content coverage home page 3300. The content coverage home page 3300 lists entertainment applications such as, but not limited to, a music app 3310, news app 3320, video app 3330, and the like, a map application 3340, and other applications along with an operational status. Given that there is a wireless coverage disruption, each of the listed applications may have a message button to initiate/not initiate content download. For example, the map app 3340 may have a message button 3342 to download an updated itinerary for offline use and the music app 3310 may a message button 3312 to download music for offline listening. In an implementation, clicking of the message button 3312 to initiate a download, for example, may generate a further message button asking what content to download and the like. In an implementation, clicking of the message button 3312 to not initiate a download, for example, may generate a further message button similar to the confirmation notification 3200, which may provide the user a second opportunity to download content prior to wireless coverage disruption.

Figure 4:
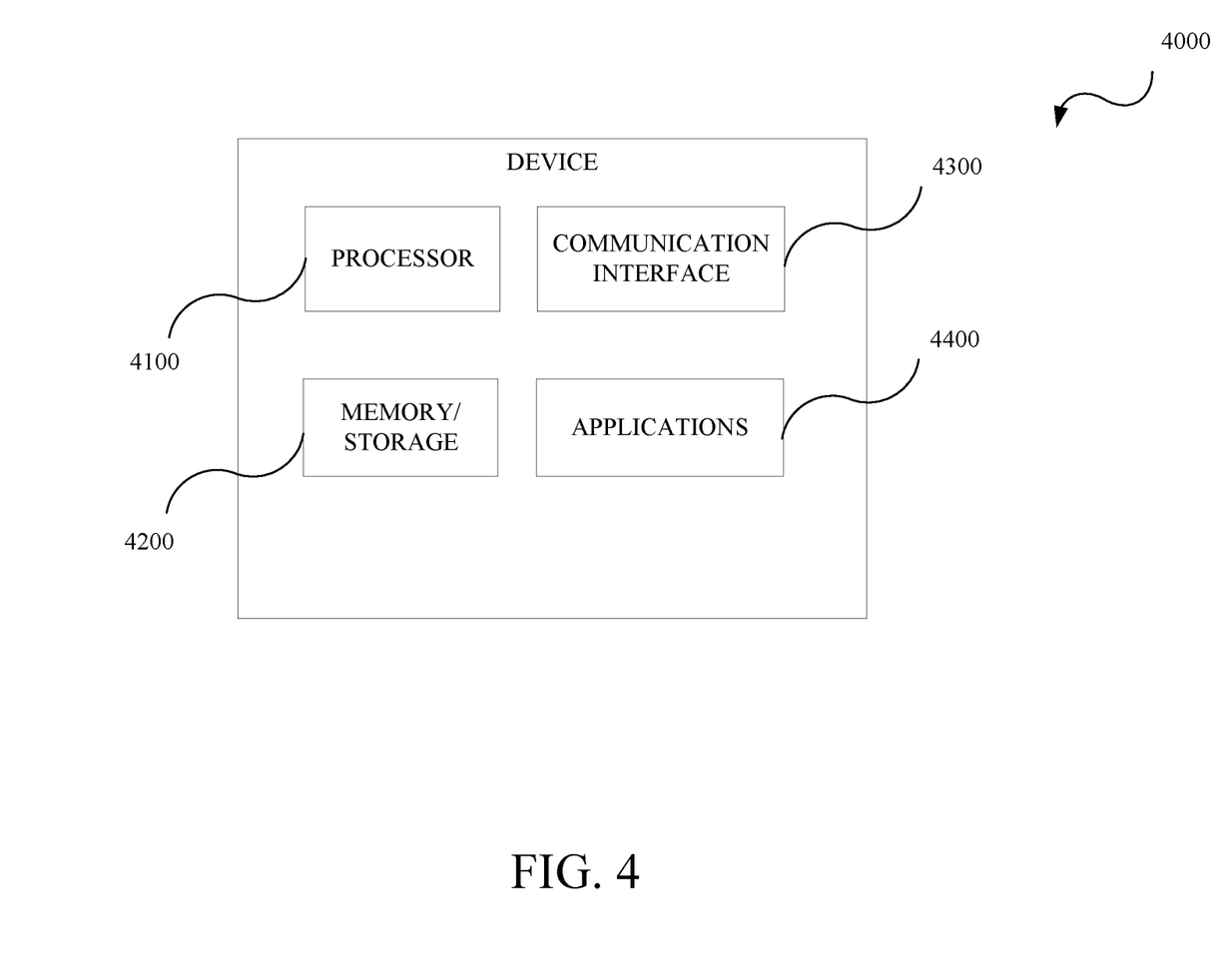
FIG. 4 is a block diagram of an example of a device in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, and applications 4400. The device 4000 may include or implement, for example, the mobile device 2100, elements of the content provider servers 2200, the IP video application server 2210, the music server 2220, the map provider server 2300, and the coverage determination server 2400. In an implementation, the memory/storage 4200 may store the list of applications, the itinerary, the wireless coverage profile, and like information. The coverage determination and download opportunity notification techniques or methods described herein may be stored in the memory/storage 4200 and executed by the processor 4100 in cooperation with the memory/storage 4200, the communications interface 4300, and applications 4400, as appropriate. The device 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 5:
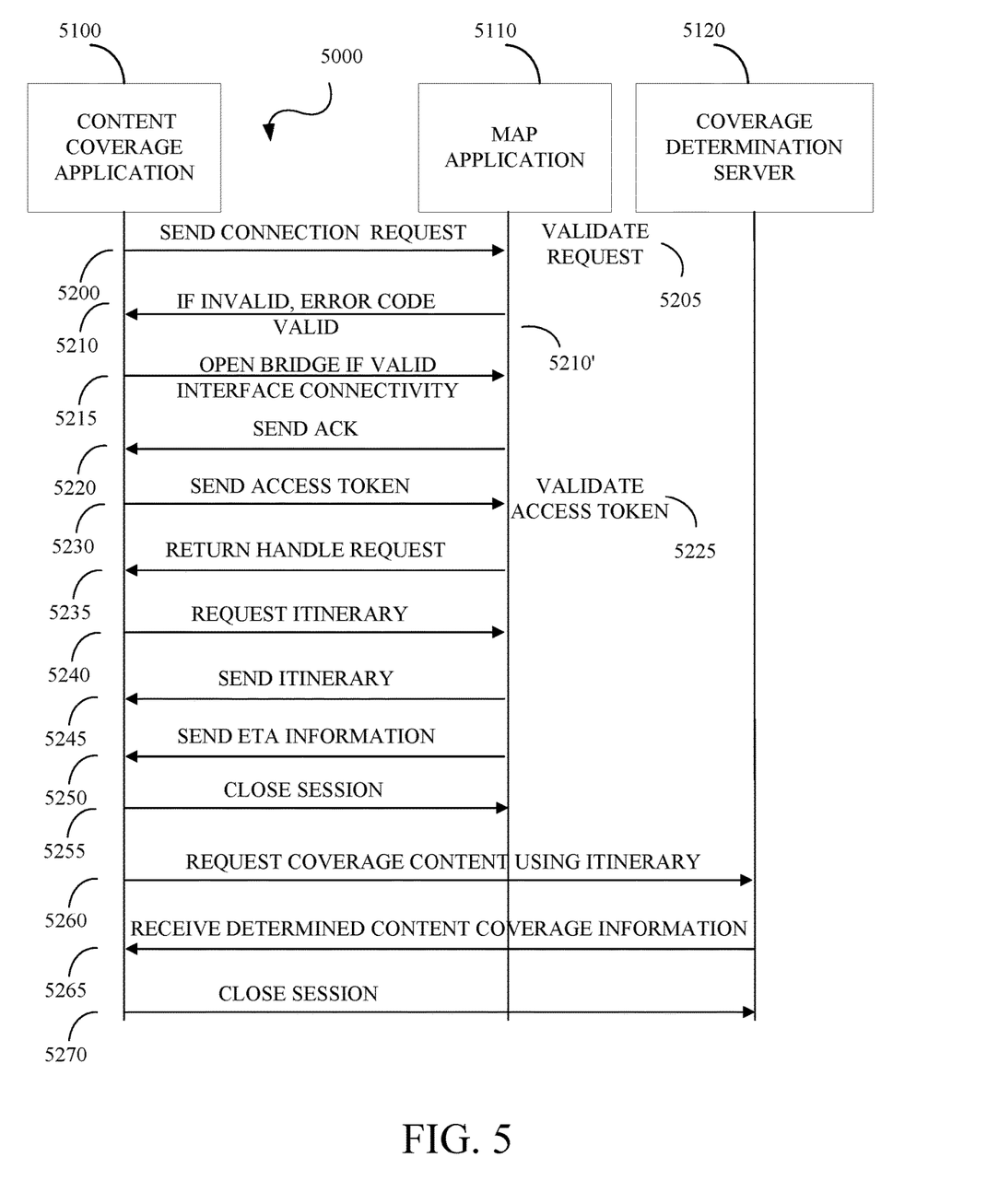
FIG. 5 is a flow diagram of an example of content coverage determination interactions between devices in accordance with embodiments of this disclosure.

FIG. 5 is a flow diagram of an example flow 5000 of content coverage determination interactions between devices in accordance with embodiments of this disclosure. The flow 5000 describes interactions between a content coverage application 5100, a map application 5110, and a coverage determination server 5120. The content coverage application 5100 sends a connection request to the map application 5110 (5200). In an implementation, the connection request may be part of a request-response protocol between a client and server. For example, the request-response protocol may be a Hypertext Transfer Protocol (HTTP) protocol and the connection request may be a HTTP request. The map application 5110 performs request validation (5205). In the event of an invalid request, the map application 5110 sends an error message (5210). For example, in the HTTP protocol, this may be a HTTP 400 message. In the event of a valid request (5210'), the content coverage application 5100 opens a communication bridge with the map application 5110 to establish an interface connection (5215). In response, the map application 5110 sends an acknowledgement (ACK) (5220). Upon receipt of the ACK, the content coverage application 5100 sends an access token (5225). The map application 5110 performs access token validation (5230) and returns a handle request if the access token is valid (5235). The content coverage application 5100 sends a request itinerary message (5240) and the map application 5110 sends the itinerary (5245) and estimated time of arrival information (5250). The content coverage application 5100 closes the session with the map application 5110 (5255). The content coverage application 5100 sends the itinerary and mobile device characteristics to the coverage determination server 5120 (5260). The coverage determination server 5120 sends the determined content coverage information (wireless coverage profile) to the content coverage application 5100 (5265). The content coverage application 5100 closes the session with the coverage determination server 5120 (5270).

Figure 6:
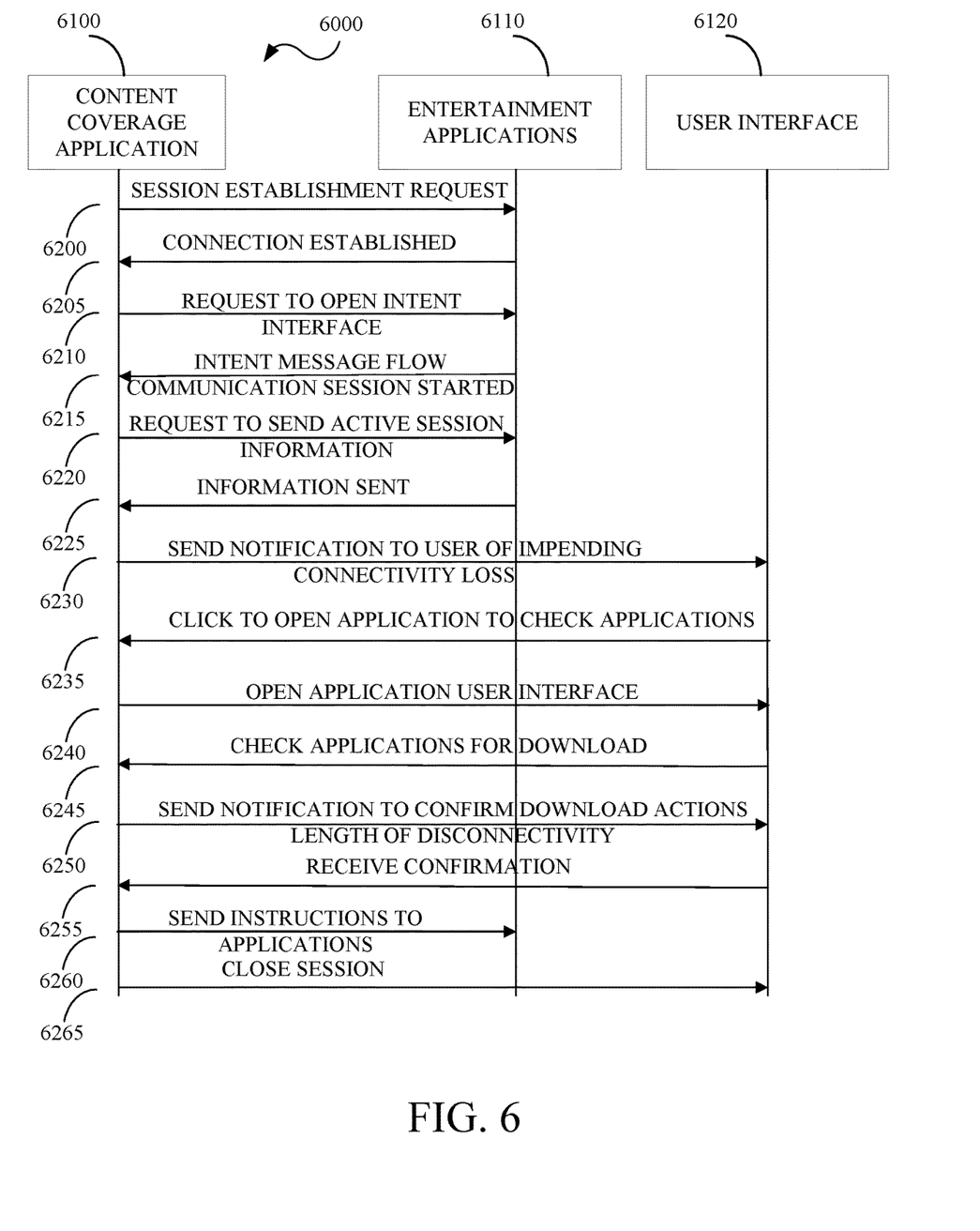
FIG. 6 is a flow diagram of an example of download opportunity interactions between devices in accordance with embodiments of this disclosure.

FIG. 6 is a flow diagram of an example flow 6000 of download opportunity interactions between devices in accordance with embodiments of this disclosure. The flow 6000 describes interactions between a content coverage application 6100, entertainment applications 6110, and instances of a user interface 6120. The content coverage application 6100 sends a session establishment request to one or more entertainment applications 6110 (6200). The one or more entertainment applications 6110 respond by establishing a session connection with the content coverage application 6100 (6205). The content coverage application 6100 sends a request to open an intent interface with the one or more entertainment applications 6110 (6210). The one or more entertainment applications 6110 respond by establishing an intent message flow communication session with the content coverage application 6100 (6215). The content coverage application 6100 sends a request to send active session information (6220). Each of the one or more entertainment applications 6110 respond by sending the requested information (6225).

In response to an impending wireless coverage disruption based on the wireless coverage profile determined as described in FIG. 6 for example, the content coverage application 6100 sends a notification to the user via an instance of the user interface 6120 (6230). The content coverage application 6100 receives a signal to open the content coverage application 6100 (6235) and opens an instance of the user interface 6120 which shows a list of the one or more entertainment applications 6110 (6240). In an implementation, a map application can also be listed in this instance of the user interface 6120. The content coverage application 6100 receives user-based signals to initiate/not initiate downloading of content from the one or more entertainment applications 6110 and the map application, as appropriate (6245). The content coverage application 6100 sends a confirmation notification to the user via an instance of the user interface 6120 (6250). In response to receiving a confirmation signal (6255), the content coverage application 6100 sends instructions or signals to the one or more entertainment applications 6110 and the map application, as appropriate, to initiate content download (6260). The content coverage application 6100 closes the instance of the user interface 6120 which shows the list of the one or more entertainment applications 6110 and the map application, as appropriate (6265).

The content coverage application described herein can use application program interface (APIs) to connect to the map application, the coverage determination server, the entertainment applications, and other applications. In an implementation, the content coverage application can use a Representational state transfer (REST) API to retrieve and manage data over the Internet. In an implementation, the API or RESTful API interface can be integrated with the content coverage application to connect or interface with the map application, the coverage determination server, the entertainment applications, and other applications. The content coverage application can use inter-process communication or interprocess communication (IPC) to communicate with the other applications and synchronize actions at the operating system level. In an implementation, the content coverage application processes can communicate using shared memories, where processes exchange data quicker than by reading and writing using the regular operating system. In an implementation, the content coverage application processes can communicate using message passing, where processes exchange data using an interface to a system managed queue of messages.

Figure 7:
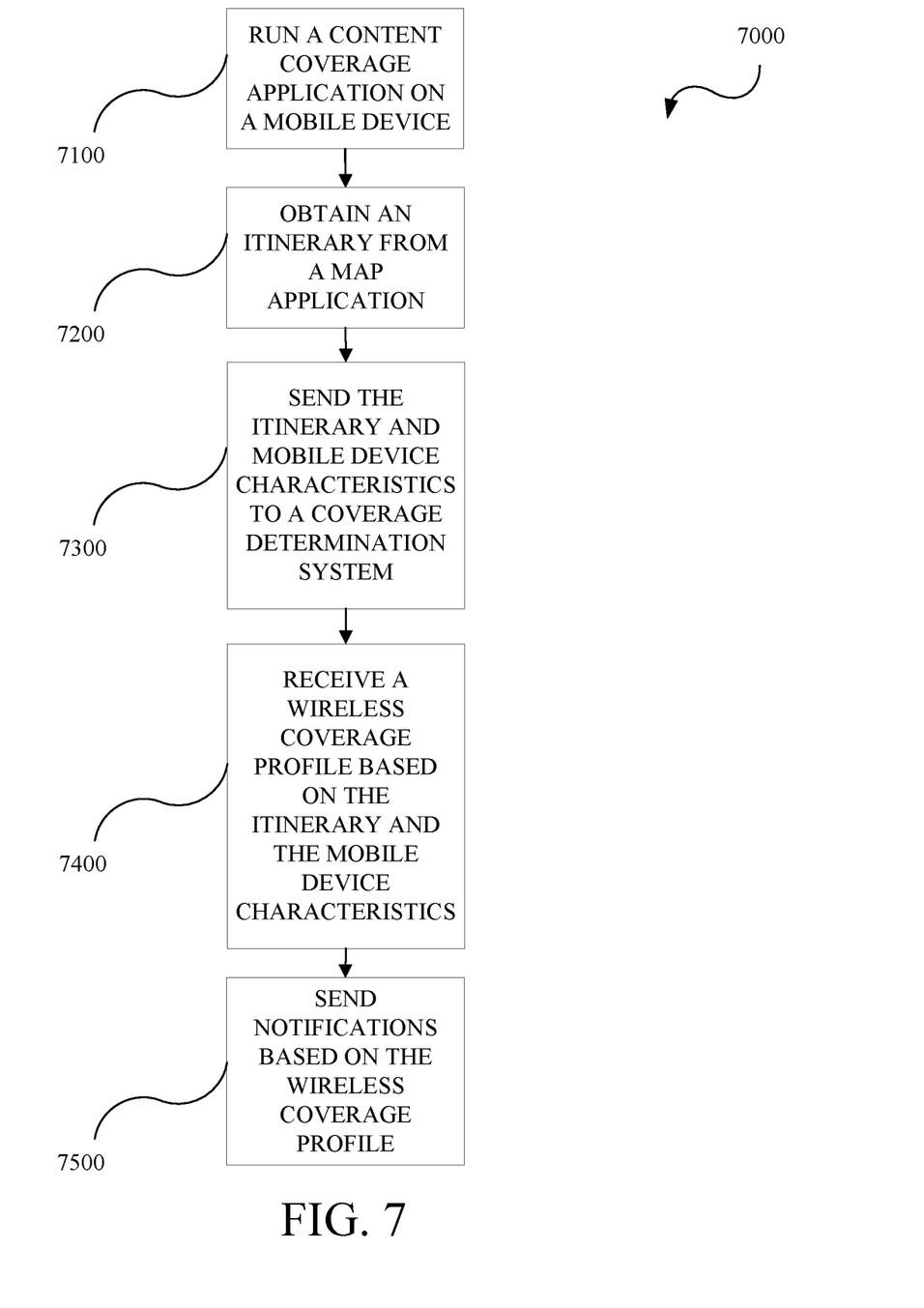
FIG. 7 is a flowchart of an example method for content coverage determination and download opportunity in accordance with embodiments of this disclosure.

FIG. 7 is a flowchart of an example method 7000 for content coverage determination and download opportunity in accordance with embodiments of this disclosure. The method 7000 includes: running 7100 a content coverage application on a mobile device; obtaining 7200 an itinerary from a map application; sending 7300 the itinerary and mobile device characteristics to a coverage determination system; receiving 7400 a wireless coverage profile based on the itinerary and the mobile device characteristics; and sending 7500 notifications based on the wireless coverage profile. For example, the method 7000 may be implemented, as applicable and appropriate, by the mobile device 2100 of FIG. 2, the map application 2120 of FIG. 2, the content coverage application 2125 of FIG. 2, the entertainment applications 2130 of FIG. 2, the IP video application 2132 of FIG. 2, the music application 2134 of FIG. 2, the content provider servers 2200 of FIG. 2, the IP video application server 2210 of FIG. 2, the music application server 2220 of FIG. 2, the map provider server 2300 of FIG. 2, the coverage determination server 2400 of FIG. 2, the content coverage application 5100 of FIG. 5, the map application 5110 of FIG. 5, the coverage determination server 5120 of FIG. 5, the content coverage application 6100 of FIG. 6, the entertainment applications 6110 of FIG. 6, and the user interface 6120 of FIG. 6.

The method 7000 includes running 7100 a content coverage application on a mobile device. In an implementation, the running 7100 includes providing and installing the content coverage application on the mobile device.

The method 7000 includes obtaining 7200 an itinerary from a map application. In an implementation, the obtaining 7200 includes the content coverage application connecting with a map application which is installed and running on the mobile device. The content coverage application requests itinerary data which the map application has generated in response to user entry of a start point and an end point. The request may be responsive to polling by the content coverage application of the map application, event driven communication between the content coverage application and the map application, and/or a combination thereof.

The method 7000 includes sending 7300 the itinerary and mobile device characteristics to a coverage determination system. In an implementation, the sending 7200 includes the content coverage application retrieving and/or obtaining the mobile device characteristics from the mobile device. In an implementation, the sending 7300 includes connecting to the coverage determination system to send the itinerary and mobile device characteristics.

The method 7000 includes receiving 7400 a wireless coverage profile based on the itinerary and the mobile device characteristics and sending 7500 notifications based on wireless coverage profile. The content coverage application uses the wireless coverage profile to provide, send, or push notifications to a user of the mobile device of wireless coverage gaps associated with the itinerary. In an implementation, the notifications can be popup windows, banner messages, and the like. In an implementation, the notifications can be sent based on a defined distance from the wireless coverage gap. In an implementation, the notifications can be sent based on a defined time interval from the wireless coverage gap. In an implementation, the notifications can be sent based on a defined distance, a defined time interval, and/or combinations thereof from the wireless coverage gap.

Figure 8:
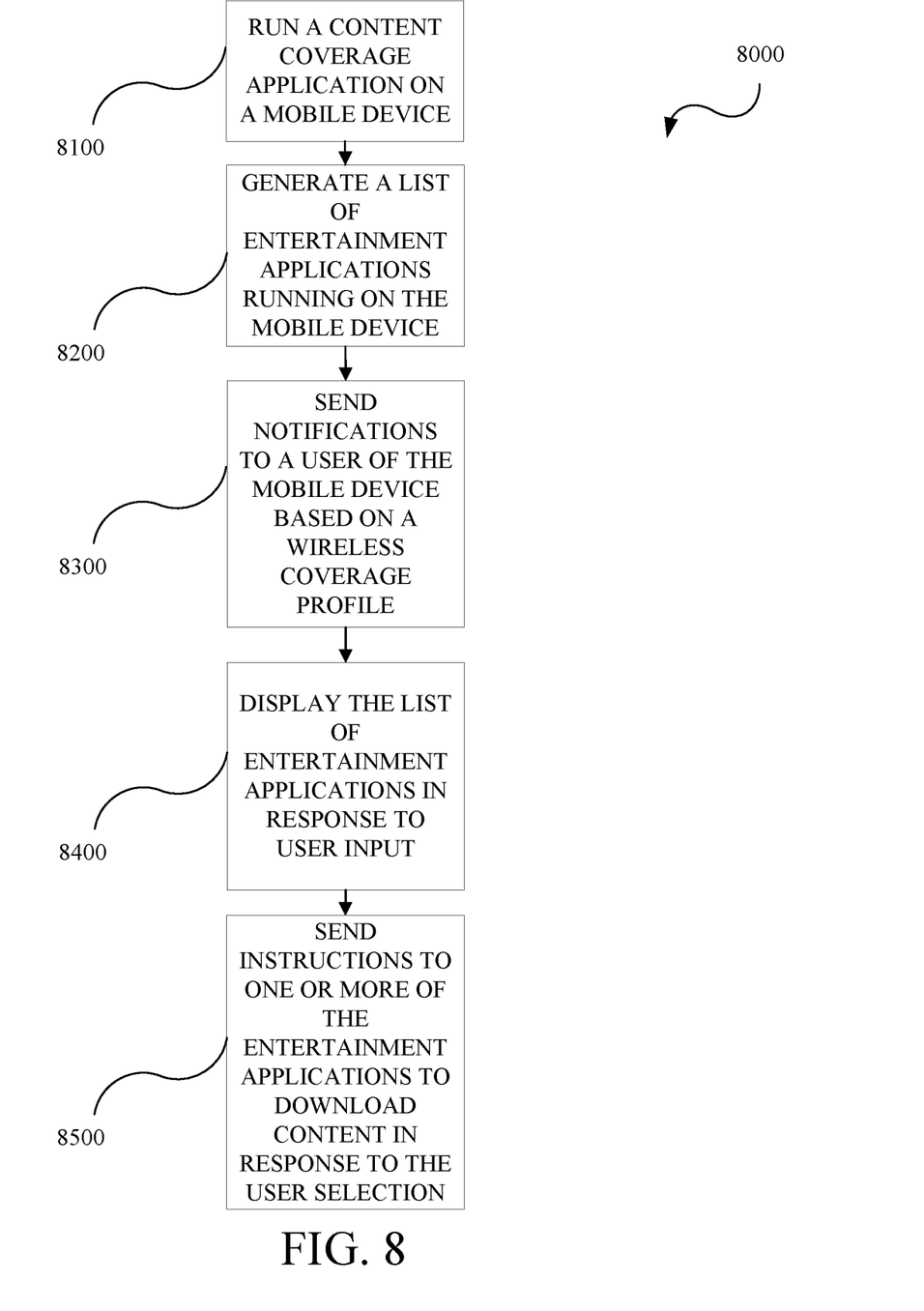
FIG. 8 is a flowchart of another example method for content coverage determination and download opportunity in accordance with embodiments of this disclosure.

FIG. 8 is a flowchart of an example method 8000 for content coverage determination and download opportunity in accordance with embodiments of this disclosure. The method 8000 includes: running 8100 a content coverage application on a mobile device; generating 8200 a list of entertainment applications running on the mobile device; sending 8300 notifications to a user of the mobile device based on a wireless coverage profile; displaying 8400 the list of entertainment applications in response to user input; and sending 8500 instructions to one or more of the entertainment applications to download content in response to user input. For example, the method 8000 may be implemented, as applicable and appropriate, by the mobile device 2100 of FIG. 2, the map application 2120 of FIG. 2, the content coverage application 2125 of FIG. 2, the entertainment applications 2130 of FIG. 2, the IP video application 2132 of FIG. 2, the music application 2134 of FIG. 2, the content provider servers 2200 of FIG. 2, the IP video application server 2210 of FIG. 2, the music application server 2220 of FIG. 2, the map provider server 2300 of FIG. 2, the coverage determination server 2400 of FIG. 2, the content coverage application 5100 of FIG. 5, the map application 5110 of FIG. 5, the coverage determination server 5120 of FIG. 5, the content coverage application 6100 of FIG. 6, the entertainment applications 6110 of FIG. 6, and the user interface 6120 of FIG. 6.

The method 8000 includes running 8100 a content coverage application on a mobile device. In an implementation, the running 8100 includes providing and installing the content coverage application on the mobile device.

The method 8000 includes generating 8200 a list of entertainment applications running on the mobile device. In an implementation, the generating 8200 includes connecting to entertainment applications running on the mobile device and obtaining status information. In an implementation, the generating 8200 includes updating the list and the status by polling the entertainment applications, event driven communication between the content coverage application and the entertainment applications, and/or a combination thereof. In an implementation, the list can include a map application.

The method 8000 includes sending 8300 notifications to a user of the mobile device based on a wireless coverage profile. In an implementation, the sending 8300 includes the content coverage application obtaining the wireless coverage profile from a coverage determination system, where the wireless coverage profile is based on an itinerary of a user and characteristics of the mobile device. The content coverage application initiates popup windows, banner messages, and the like when the wireless coverage profile indicates a gap in coverage. In an implementation, the notifications can be sent based on a defined distance from the gap. In an implementation, the notifications can be sent based on a defined time interval from the gap. In an implementation, the notifications can be sent based on a defined distance, a defined time interval, and/or combinations thereof from the gap.

The method 8000 includes displaying 8400 the list of entertainment applications in response to user input. The content coverage application opens a graphical user interface via which the user can review the entertainment applications, the map application, and the like. The user can select which content is to be downloaded. In an implementation, the content coverage application sends a confirmation notification in response to the user selection.

The method 8000 includes sending 8500 instructions to one or more of the entertainment applications to download content in response to the user selection. The content coverage application sends signals to each selected entertainment application. In an implementation, the content coverage application sends a signal to the map application to download an updated itinerary.

Figure 9:
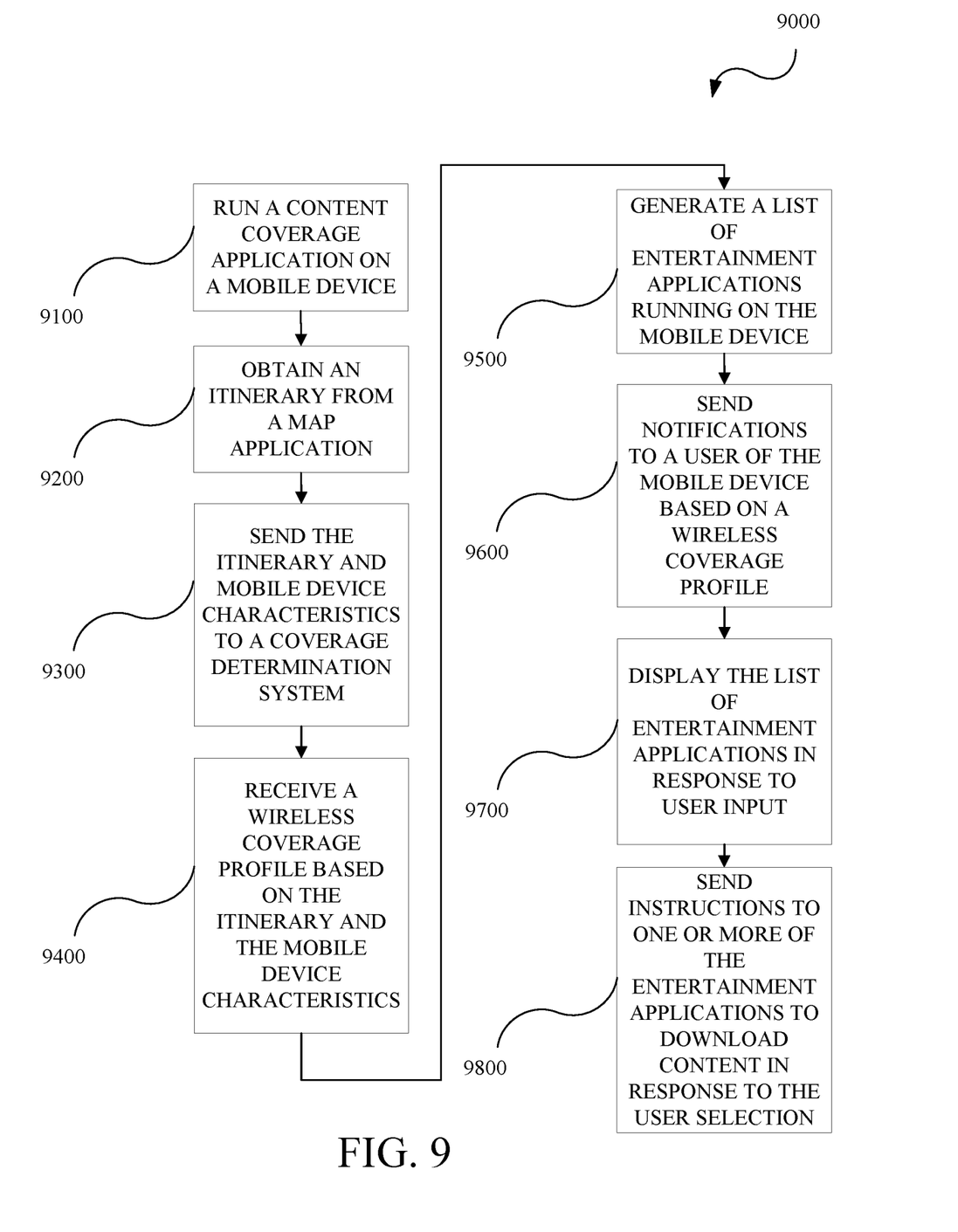
FIG. 9 is a flowchart of another example method for content coverage determination and download opportunity in accordance with embodiments of this disclosure.

FIG. 9 is a flowchart of an example method 9000 for content coverage determination and download opportunity in accordance with embodiments of this disclosure. The method 9000 includes: running 9100 a content coverage application on a mobile device; obtaining 9200 an itinerary from a map application; sending 9300 the itinerary and mobile device characteristics to a coverage determination system; receiving 9400 a wireless coverage profile based on the itinerary and the mobile device characteristics; generating 9500 a list of entertainment applications running on the mobile device; sending 9600 notifications to a user of the mobile device based on coverage gaps in the wireless coverage profile; displaying 9700 the list of entertainment applications in response to user input; and sending 9800 instructions to one or more of the entertainment applications to download content in response to user input. For example, the method 9000 may be implemented, as applicable and appropriate, by the mobile device 2100 of FIG. 2, the map application 2120 of FIG. 2, the content coverage application 2125 of FIG. 2, the entertainment applications 2130 of FIG. 2, the IP video application 2132 of FIG. 2, the music application 2134 of FIG. 2, the content provider servers 2200 of FIG. 2, the IP video application server 2210 of FIG. 2, the music application server 2220 of FIG. 2, the map provider server 2300 of FIG. 2, the coverage determination server 2400 of FIG. 2, the content coverage application 5100 of FIG. 5, the map application 5110 of FIG. 5, the coverage determination server 5120 of FIG. 5, the content coverage application 6100 of FIG. 6, the entertainment applications 6110 of FIG. 6, and the user interface 6120 of FIG. 6.

The method 9000 includes running 9100 a content coverage application on a mobile device. In an implementation, the running 9100 includes providing and installing the content coverage application on the mobile device.

The method 9000 includes obtaining 9200 an itinerary from a map application. In an implementation, the obtaining 9200 includes the content coverage application connecting with a map application which is installed and running on the mobile device. The content coverage application requests itinerary data which the map application has generated in response to user entry of a start point and an end point. The request may be responsive to polling by the content coverage application of the map application, event driven communication between the content coverage application and the map application, and/or a combination thereof.

The method 9000 includes sending 9300 the itinerary and mobile device characteristics to a coverage determination system. In an implementation, the sending 9300 includes the content coverage application retrieving and/or obtaining the mobile device characteristics from the mobile device. In an implementation, the sending 9300 includes connecting to the coverage determination system to send the itinerary and mobile device characteristics.

The method 9000 includes receiving 9400 a wireless coverage profile based on the itinerary and the mobile device characteristics. The wireless coverage profile including information regarding wireless coverage gaps.

The method 9000 includes generating 9500 a list of entertainment applications running on the mobile device. In an implementation, the generating 9500 includes connecting to entertainment applications running on the mobile device and obtaining status information. In an implementation, the generating 9500 includes updating the list and the status by polling the entertainment applications, event driven communication between the content coverage application and the entertainment applications, and/or a combination thereof. In an implementation, the list can include a map application.

The method 9000 includes sending 9600 notifications to a user of the mobile device based on a wireless coverage profile. The content coverage application initiates popup windows, banner messages, and the like when the wireless coverage profile indicates a gap in coverage. In an implementation, the notifications can be sent based on a defined distance from the gap. In an implementation, the notifications can be sent based on a defined time interval from the gap. In an implementation, the notifications can be sent based on a defined distance, a defined time interval, and/or combinations thereof from the gap.

The method 9000 includes displaying 9700 the list of entertainment applications in response to user input. The content coverage application opens a graphical user interface via which the user can review the entertainment applications, the map application, and the like. The user can select which content is to be downloaded. In an implementation, the content coverage application sends a confirmation notification in response to the user selection.

The method 9000 includes sending 9800 instructions to one or more of the entertainment applications to download content in response to the user selection. The content coverage application sends signals to each selected entertainment application. In an implementation, the content coverage application sends a signal to the map application to download an updated itinerary.

In general, a method for content coverage determination and download opportunity includes obtaining, by a content coverage application running on a mobile device, an itinerary from a map application on the mobile device, sending, by the content coverage application, the itinerary and mobile device characteristics to a coverage determination system, receiving, by the content coverage application, a wireless coverage profile based on the itinerary and the mobile device characteristics, generating, by the content coverage application, a list of entertainment applications running on the mobile device, providing, by the content coverage application to a user of the mobile device, a notification of a wireless coverage gap based on the wireless coverage profile, displaying, on the mobile device, the list of entertainment applications and status for each listed entertainment application in response to user input with respect to the notifications, and sending, by the content coverage application, instructions to one or more of the listed entertainment applications to download content in response to user selections.

In an implementation, the notification indicates at least one of time interval to the wireless coverage gaps or distance to the wireless coverage gap. In an implementation, the notification indicates length of the wireless coverage gap. In an implementation, the notification is sent a defined time interval from the wireless coverage gap. In an implementation, the notification is sent a defined distance from the wireless coverage gap. In an implementation, the obtaining is responsive to user entry of a start point and an end point. In an implementation, the method further including connecting, by the content coverage application, to entertainment applications provided on the mobile device, and obtaining, by the content coverage application, the status from each entertainment application. In an implementation, the method including updating, by the content coverage application, the list of entertainment applications based on at least one of event driven communications or polling. In an implementation, the method including updating, by the content coverage application, the status of the list of entertainment applications based on at least one of event driven communications or polling. In an implementation, the displaying further including displaying, on the mobile device, the map application, the method further including sending, by the content coverage application, instructions to the map application to download an updated itinerary for offline use. In an implementation, the method including retrieving, by the content coverage application, the mobile device characteristics from the mobile device.

In general, a method for content coverage determination and download opportunity includes receiving, by an application operating on a mobile device, a travel path from a map application on the mobile device, receiving, by the application from a server, network coverage information based on the travel path and mobile device specifications sent by the application, pushing, by the application to a user of the mobile device, an outage notification based on the network coverage information, and providing, by the application, signals to one or more content applications to download content in response to user selections based on the outage notification. In an implementation, the method further including generating, by the application, a list of content applications running on the mobile device, and opening, on the mobile device, a user interface to display the list of content applications in response to user input based on the outage notification. In an implementation, the notification indicates length of the outage area and at least one of time interval to an outage area or distance to the outage area. In an implementation, the outage notification is sent a defined unit from the outage area.

In general, a mobile device includes a display, an application, and a processor configured to run the application, where the application is configured to obtain a route from a map service provided on the mobile device, obtain a coverage profile from a coverage server based on the itinerary and mobile device characteristics, obtain which media applications are provided on the mobile device, provide an outage alert on the display based on the coverage profile, display a list of the media applications in response to user clicking on the outage alert, and instruct one or more of the listed media applications to download content in response to user selections. In an implementation, the outage alert indicates a time length of the outage area and indicates at least one of time interval to the outage area or a distance to the outage area. In an implementation, the notification is sent a defined time interval from the wireless coverage gap. In an implementation, the notification is sent a defined distance from the wireless coverage gap. In an implementation, the application is configured to display the map service in response to user clicking on the outage alert and instruct the map service to download updated route for offline use in response to user selection.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for content coverage determination and download opportunity, the method comprising:
   obtaining, by a content coverage application running on a mobile device, an itinerary from a map application on the mobile device, wherein the itinerary has a start point and an end point;
   sending, by the content coverage application, the itinerary and mobile device specifications to a coverage determination system;
   receiving, by the content coverage application, a wireless coverage profile based on the itinerary and the mobile device specifications;
   generating, by the content coverage application, a list of entertainment applications running on the mobile device;
   providing, by the content coverage application to a user of the mobile device, a notification of a wireless coverage gap based on the wireless coverage profile;
   displaying, on the mobile device for selection by the user, the list of entertainment applications and status for each listed entertainment application in response to user input with respect to the notification;
   receiving, by the content coverage application from the user, content download selections using the list of entertainment applications in response to the notification; and
   sending, by the content coverage application, instructions to one or more of the listed entertainment applications to download content prior to the wireless coverage gap in response to the content download selections from the user.

2. The method of claim 1, wherein the notification indicates at least one of time interval to the wireless coverage gap or distance to the wireless coverage gap.

3. The method of claim 2, wherein the notification indicates length of the wireless coverage gap.

4. The method of claim 3, wherein the notification is sent a defined time interval from the wireless coverage gap.

5. The method of claim 4, wherein the obtaining is responsive to user entry of the start point and the end point.

6. The method of claim 5, further comprising:
   connecting, by the content coverage application, to entertainment applications provided on the mobile device; and
   obtaining, by the content coverage application, the status from each entertainment application.

7. The method of claim 6, further comprising:
   updating, by the content coverage application, the list of entertainment applications based on at least one of event driven communications or polling.

8. The method of claim 7, wherein the displaying further comprising displaying, on the mobile device, the map application, the method further comprising:
   sending, by the content coverage application, instructions to the map application to download an updated itinerary for offline use.

9. The method of claim 8, further comprising:
   retrieving, by the content coverage application, the mobile device specifications from the mobile device.

10. The method of claim 6, further comprising:
    updating, by the content coverage application, the status of the list of entertainment applications based on at least one of event driven communications or polling.

11. The method of claim 3, wherein the notification is sent a defined distance from the wireless coverage gap.

12. A method for content coverage determination and download opportunity, the method comprising:
    receiving, by an application operating on a mobile device, a travel path from a map application on the mobile device, wherein the travel path has a start point and an end point;
    receiving, by the application, network coverage information from a server based on the travel path and mobile device specifications sent by the application;
    generating, by the application, a list of content applications running on the mobile device;
    pushing, by the application to a user of the mobile device, an outage notification of a network outage based on the network coverage information;
    opening, on the mobile device, a user interface to display the list of content applications in response to user input based on the outage notification;
    receiving, by the application from the user, content download selections in response to the outage notification; and providing, by the application, signals to one or more content applications to download content prior to the network outage in response to the content download selections from the user based on the outage notification.

13. The method of claim 12, wherein the outage notification indicates length of the network outage and at least one of time interval to the network outage or distance to the network outage.

14. The method of claim 13, wherein the network outage notification is sent a defined unit from the network outage.

15. A mobile device comprising:
a display;
an application; and
a processor configured to run the application, wherein the application is configured to:
obtain a route from a map service provided on the mobile device, wherein the itinerary has a start point and an end point;
obtain a coverage profile from a coverage server based on the route and mobile device specifications;
obtain a list of media applications which are provided on the mobile device;
provide an outage alert for a network coverage gap on the display based on the coverage profile;
display the list of the media applications in response to user clicking on the outage alert;
receive content download selections using the list of media applications in response to the outage alert; and
instruct one or more of the listed media applications to download content prior to the network coverage gap in response to the content download selections from the user.

16. The mobile device of claim 15, wherein the outage alert indicates a time length of the network outage gap and indicates at least one of time interval to the network outage gap or a distance to the network outage gap.

17. The mobile device of claim 15, wherein the outage alert is sent a defined time interval ahead based on the coverage profile, wherein the defined time interval ahead is relative to one of the time interval to the network outage gap or the distance to the network outage gap.

18. The mobile device of claim 15, wherein the outage alert is sent a defined distance ahead based on the coverage profile, wherein the defined distance ahead is relative to one of the time interval to the network outage gap or the distance to the network outage gap.

19. The method of claim 15, wherein the application is configured to:
display the map service in response to user clicking on the outage alert; and
instruct the map service to download updated route for offline use in response to user selection.

* * * * *